Nov. 18, 1969          C. P. FOGARTY                3,478,986
                     SPACE DELIVERY SYSTEM
Filed Dec. 6, 1967                          3 Sheets-Sheet 1
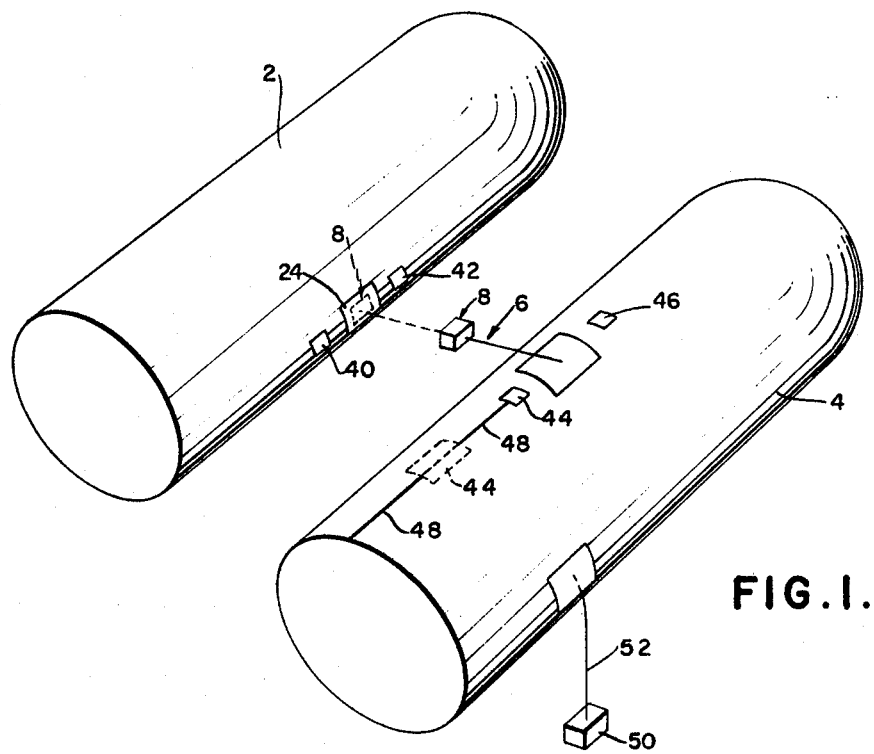
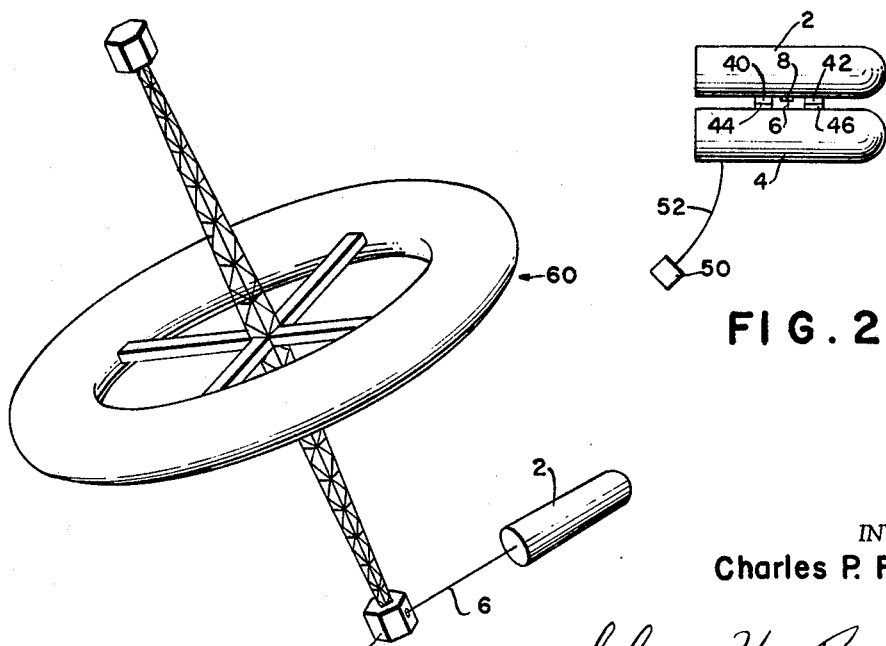
INVENTOR
Charles P. Fogarty
BY Clive H. Bramson
                    ATTORNEY Nov. 18, 1969  C. P. FOGARTY  3,478,986
SPACE DELIVERY SYSTEM
Filed Dec. 6, 1967  3 Sheets-Sheet 2

INVENTOR
Charles P. Fogarty

BY Olive H. Bramson
ATTORNEY

Nov. 18, 1969  C. P. FOGARTY  3,478,986
SPACE DELIVERY SYSTEM
Filed Dec. 6, 1967  3 Sheets-Sheet 3

INVENTOR.
Charles P. Fogarty
BY
ATTORNEY

※United States Patent Office 3,478,986
Patented Nov. 18, 1969

3,478,986
SPACE DELIVERY SYSTEM
Charles P. Fogarty, 218 Townline Road,
Commack, N.Y. 11725
Continuation-in-part of application Ser. No. 487,194,
Sept. 14, 1965. This application Dec. 6, 1967, Ser.
No. 691,107
Int. Cl. B64g 1/00
U.S. Cl. 244—1                            20 Claims

ABSTRACT OF THE DISCLOSURE

The present disclosure relates to a space delivery system for delivering items between space vehicles or for coupling space vehicles. The device involves a flexible extensible cable fed from a reel and through which is delivered gas to the front of the cable where it is directed backwardly to propel the front end of the cable forwardly.

---

The present specification is a continuation-in-part of Ser. No. 487,194 filed Sept. 14, 1965, now abandoned.

The present invention relates to a space delivery system and, more particularly, to a device for either coupling space vehicles together or transferring items from one space vehicle to another.

Whereas space technology is now advanced to the stage where the linking up of artificial satellites and other space vehicles is an essential desideratum, the present invention is concerned with the provision of means for accomplishing the connection of such space members in a practical and highly effective manner or for delivering items from one space member to another.

Accordingly, an object of this invention is to provide for the transfer of items from one space vehicle to another.

It is another object of the present invention to provide for the coupling of a plurality of space vehicles or sections.

Another object of the present invention is to provide a method for coupling a plurality of space vehicles or sections to the ends of facilitating the transference of cargo, personnel and the like from one craft to another.

Another object of the present invention resides in the provision of a magnetic coupling system whereby one space vehicle may be towed by another; whereby space stations may be assembled and whereby space vehicles may be docked to a platform or station when required.

Another object of the invention is to provide a method for uniting two objects in space with expedience and control and with the obviation of difficulties concerning alignment and impact of said objects.

A further object of the instant coupling system is to provide means facilitating direct communication between space ships where said ships are spacedly connected by cable means.

A still further object of this invention resides in the provision of means facilitating the coupling and decoupling of space vehicles.

Another object of the present invention is to provide a "life line" between the space ships permitting the passage of personnel between said ships utilizing a connecting cable as a railing to prevent drift and for permitting directional guidance.

Another object of the invention is the magnetic or other connection of objects relatively distant with respect to a space ship without necessitating the movement of the ship or requiring personnel to depart therefrom.

Still another object of the instant invention is to permit the transportation of a payload equivalent to the capacity of several conventional vehicles carrying full loads whereby a vehicle equipped with the present device would be coupled with a cargo ship of substantially greater mass whereby the latter could be towed.

A further object of the invention disclosed herein is the provision of tow means capable of moving sections of space stations and the like to location and of aligning and connecting said sections with respect to each other in a safe, positive and expedient manner.

A still further object of this invention resides in the provision of means for retrieving magnetically attractable objects in space at a specific location so that ships would not have to rendezvous but could dump cargo which would subsequently be picked up by another ship.

Other objects of this invention will become apparent upon a more comprehensive understanding of the invention for which reference is made to the following specification and drawings and which describe illustrative embodiments of the invention and wherein:

FIGURE 1 is a perspective view of space vehicles connected by cable prior to being contiguously coupled and a pick-up magnetic device depending from one of said vehicles;

FIGURE 2 is a plan view of space vehicles connected by respective pairs of magnet members;

FIGURE 3 is a perspective view of a space station and a space ship magnetically and flexibly docked thereto;

Figure 4:
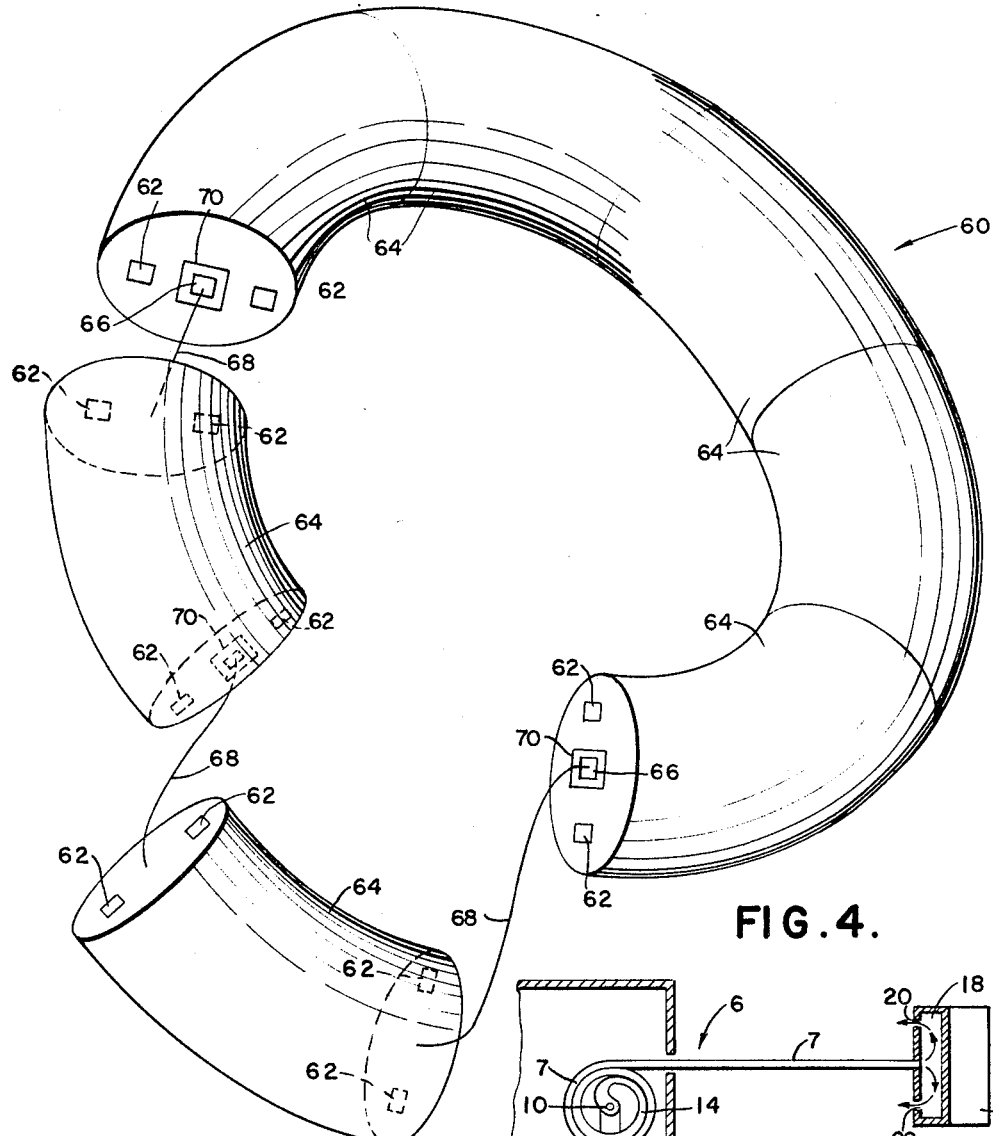
FIGURE 4 is a perspective view of a plurality of space station sections being connected by the magnetic coupling system according to the present invention.

Referring now to the drawings wherein like reference numerals refer to like or similar parts in the several figures, and more particularly to FIGURES 1 and 2, space vehicles 2 and 4 are shown respectively, in flexible and rigid coupled relation.

Essentially, flexible extensible cable generally designated by numeral 6 is provided with a magnetic harpoon, or other suitable coupling, securing or grappling means, generally designated by the numeral 8 connected at the free end thereof. Thus, when the term "securing means" is used in the specification and claims it is meant to include any means which will attach two objects together such as coupling or grappling means. It is understood that many securing means require a corresponding mating element on the device to be secured thereto, such as the cooperative magnet members 40 and 44 as well as 42 and 46 of FIG. 2. The coupling means is movably connected to space vehicle 4 via said flexible extensible cable, exemplary methods of carrying out such connection being shown in FIGURES 5 and 6 of the accompanying drawings.

Figure 5:
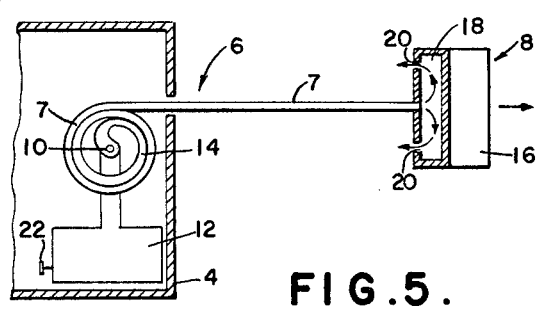
FIGURE 5 is a cross-sectional elevational view of an exemplary magnet harpoon or coupling means and motivation and retraction means associated therewith.
Figure 10:
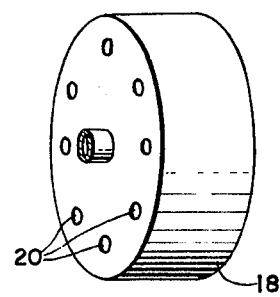
FIGURE 10 is a detailed perspective view of the plenum chamber of FIGS. 5–8.

With specific reference to FIGURE 5, it will be seen that cable means 6 is a flexible tubular member 7 and is connected at its end 10 to a supply of compressed gas 12, the latter being mounted within said space vehicle 4. Cable 6 is windable on a two-way motor driven takeup reel 14, the latter being referred to herein as retraction means. As shown in FIGURE 5, a coupling means 8 is comprised preferably of a magnet, such as permanent magnet 16, and a cylindrical plenum chamber 18 provided rearwardly of said magnet, nozzle orifices 20 being provided as shown (note FIGURE 10) wherethrough gas from said compressed gas supply 12 may be controllably emitted upon regulation of control valve 22. Accordingly, it will be appreciated that gas emitted through said orifices will effectuate directional propulsion of said harpoon means 8 outwardly of said vehicle 6 and toward a designated target area as the motor driven takeup reel 14 unwinds the cable 6, such as target area being preferably a complementary magnetic connector means 24 provided on vehicle 2 as shown in FIGURE 1 of the accompanying drawings.

In place of magnetic coupling means 8 and 24, it should be understood that any suitable coupling means may be used. Thus, in FIGURE 7, instead of providing the magnet 16 in front of the plenum chamber 18, a grappling hook 82 is provided which is capable of coupling with suitable means on the vehicle 2. If, instead of coupling, it is merely desired to deliver a suitable article from space vehicle 1 to space vehicle 2, such article may be merely attached to the hook 82 for delivery. It is particularly advantageous to provide the leading face of the plenum chamber 18 with a connecting bracket 19 to which any desired coupling means may be attached.

Figure 8:
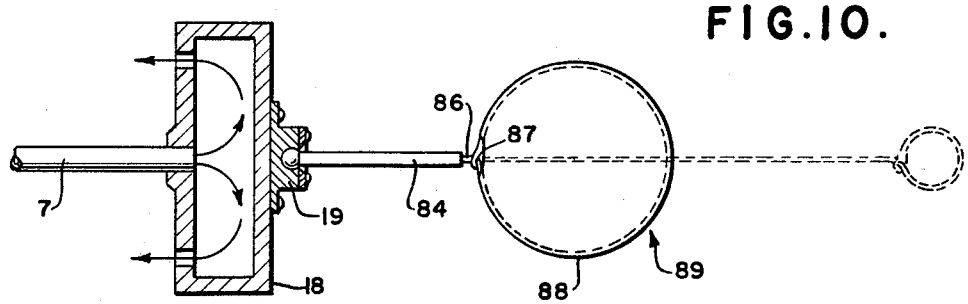
FIGURE 8 is a cross-sectional elevational view similar to FIGURES 5 and 7 showing yet another means for grappling or for delivering an article.

In FIGURE 8 another type of delivery means is shown having attached in front of the plenum 18 via the connecting bracket 19, a rope holder 84 to which is attached one end 86 of a rope 88 which forms a loop 87 at the other end, the rope 88 slidably passing through the loop 87 and forming a lasso 89. An article to be delivered is merely snuggly retained in the noose and, upon reaching space vehicle 2, may be easily removed therefrom. An article may be retrieved from space by passing the open lasso 89 to the article so that the article lies therewithin and then winding up the hose 7 on the takeup reel 14 as described above whereby the lasso 89 will tighten about the article as shown in phantom in FIGURE 8. A weak and easily frangible retainer may be initially placed within the lasso 89 to retain it in enlarged condition until the article is reached whereupon jerking of hose 7 will rupture the frangible retainer and permit functioning as described.

Figure 9:
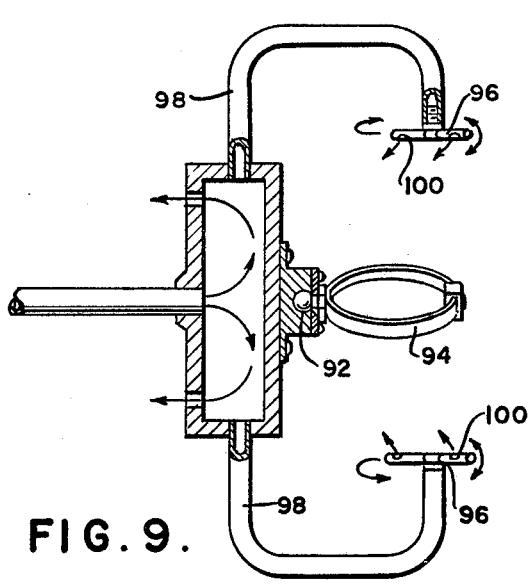
FIGURE 9 is a cross-sectional elevational view similar to FIGURES 5–8 showing human delivery means.

FIGURE 9 shows yet another delivery system specifically adapted for carrying an astronaut. Connected to the front of the plenum through a universal joint 92 is a belt means 94 for passing about the astronaut and snuggly retaining him in position. In such a delivery system, it is preferred to provide suitable means for the astronaut to hold onto, such as the pair of handles 96 which are connected to the plenum by way of the connectors 98. The connectors 98 may be solid in which case only one such connector and handle 96 is needed for support and for steering purposes; however, as a further feature, it is preferred that control means be built into the handles 96 so that the astronaut can directionally propel himself. This is simply accomplished by providing hollow connecting means 98 and hollow handles 96 which hollow handles have openings 100 therein, the handles 96 each being rotatably connected to their respective connecting means 98. By rotating the handles 96 and thereby changing the position of the holes 100, the movement of the astronaut can be controlled by passage of gas through the openings 100.

The handle 96 can be replaced by a suitable fitting for connection to air actuated tools utilizing air from the plenum chamber. Further, the hollow connectors 98 may be used for housing communication lines running from the vehicle through the cable 7 and plenum 18.

Figure 11:
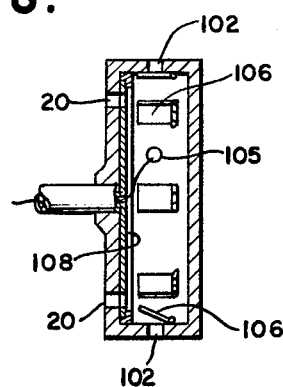
FIGURE 11 is a sectional view showing yet another embodiment.

Further control means shown in FIGURE 11 may include further outwardly directed openings 102; the openings 102 as well as the openings 20 being provided with valves 106 and 108, respectively, which may be opened and closed at will be either the astronaut or from a remote location by suitable electrical means (not shown) including radio-controlled means, if necessary. By opening and closing the desired valves, the direction of movement can be completely controlled. For remote location control, guiding lights 105 are provided, preferably one red and one green 180° apart on the plenum 18 for assisting in directional propulsion control. When all the valves 106 are opened, the plenum will be stabilized. The valves 106 are illustrated as being flap valves and valve 108 as being a rotary valve although it will be understood that any suitable valves may be used.

Figure 6:
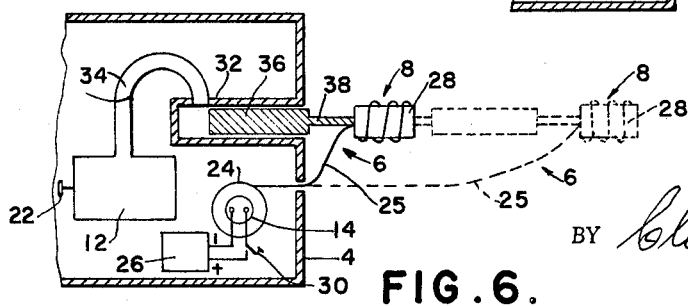
FIGURE 6 is a cross-sectional elevational view of an exemplary electromagnetic harpoon or coupling means and the motivation and retraction means associated therewith.

Another exemplary delivery means and associated structure, here shown utilizing a magnetic harpoon, is illustrated in FIGURE 6 and relates to the preferred electromagnetic coupling means which, it will be appreciated, can be controllably energized and deenergized. Flexible extensible cable 6 is comprised of electrically conductive cable 25 which carries power from battery 26 to electromagnet 28, said cable being windably receivable upon takeup reel 14, switch 30 being provided to enable controllable energization and deenergization of said electromagnet. Motivation of said electromagnet harpoon or coupling means is accomplished by the action of compressed gas which enters tubular member 32 via conduit 34 which is in communication with compressed gas supply 12, and which expands against the enlarged end 36 of shaft 38 of electromagnet 28. The gas, as aforedescribed with respect to the embodiment shown in FIGURE 5 hereof, is controlled by valve means 26. Thus, harpoon means 28 may be motivated to positions distant with respect to the space vehicle as designated in broken line in FIGURE 6 of the drawings.

Consonant with the foregoing and with reference again to FIGURE 1, the coupling means 8, the magnetic harpoon, is seen both in an approaching and contacting position with respect to space vehicle 2, flexible extensible cable means 6 being connected intermediate said harpoon and space vehicle 4. By retraction of said cable upon takeup reel 14 as shown in FIGURES 5 and 6, the vehicles 2 and 4 are drawn together as shown in FIGURE 2 of the drawings.

To the end of rigidly securing one space vehicle to the other subsequent to the retraction of coupling or securing means 8 which has been coupled using the suitable grappling means, such as the magnetic connector, pairs of spaced grappling members, such as magnet members 40, 42 and 44, 46, once permitted to assume relative proximity, draw said space vehicles mutually toward one another until connection, such as by way of magnets, is effectuated. When magnets are used, the magnets of each pair of magnet members are of opposite polarity, i.e., magnet members 40 and 46 being of north polarity and magnet members 42 and 44 being of south polarity. Therefore, it will be observed, that by dint of the prearranged locations of said members on respective space vehicles and by reason of the polarity arrangement thereof, said vehicles will be magnetically coupled in accordance with a predetermined orientation as shown in FIGURE 2.

Although the magnet members aforedescribed are arranged in pairs predeterminedly spaced in order that one pair will align and unite with the other to effectuate a prearranged connection between the vehicles, it will be understood that said magnet members may be movable to permit variation in the orientation achieved between vehicles. Thus, as illustrated in FIGURE 1, magnet member 44 shown in broken line designation, represents said member moved along track 48 and secured to the space vehicle in an alternate position. Thus, by varying the positions of said magnet members by any suitable means, said vehicles may be coupled in varying advantageous arrangements.

Figure 7:
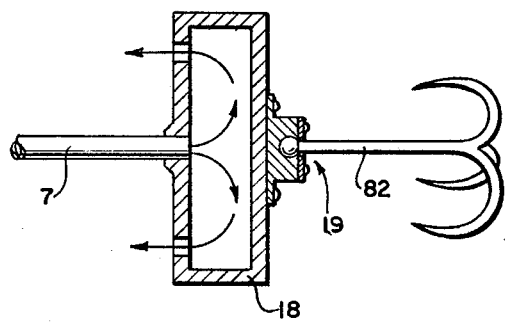
FIGURE 7 is a cross-sectional elevational view similar to FIGURE 5 but showing another type of grappling or coupling means.

The coupling or securing means 50 movably connected to space vehicle 4 via flexible extensible means 52 may structurally conform to the embodiments illustrated in aforedescribed FIGURES 5 and 6 utilizing magnetic means, or other coupling or grappling means may be used such as shown in FIGURE 7. As indicated above, the purpose may be used to align and unite space vehicles or may further include delivery, towing, pick-up of cargo, etc., in addition to the vehicle-coupling function described with respect to coupling means 8.

The coupling of other artificial space members in the manner hereinabove characterized with respect to space vehicles may be accomplished in accordance with the present disclosure. Space station 60, e.g., shown assembled in FIGURE 3 and in the stages of assembly in FIGURE 4 is another example whereby magnetic coupling means and magnet members may be advantageously utilized. That is, magnet members 62, arranged spacedly in pairs as shown, with the magnet members of each pair being of opposite polarity, when mutually attached, retain space station sections in connected, predetermined orientation. Magnetic coupling means 66 which is movably connected to one section 64 by flexible extensible means 68, is propelled in a suitable manner towards a target area or magnetic connector means 70 provided on another section 64. Upon retraction of said flexible extensible means and coupling means, the tethered sections will be drawn together, the final assembled orientation of one section with respect to another being predetermined in accordance with the positions of magnet members 62.

With further reference to FIGURE 3 of the drawings, it will be observed that the concept of the present invention may be adapted to the docking of space vehicles to space stations. Accordingly, space vehicle 2 provided with the aforedescribed magnetic harpoon or coupling means at the end of flexible cable or extensible means generally designated by numeral 6, is thereby attached to a magnetic connector 80 located at one end of the space station tower. By this method, the area otherwise required to land space craft has been eliminated and retrorockets would not be required. Once the connection is accomplished, the vehicle may be permitted to remain suspended or the cable may be retracted as described herein whereby the vehicle may be caused to contact the tower.

The cable which may be tubular as described, may be used as a conduit through which materials may be transported from one space vehicle to another. Electrical power, communications and the like may similarly be carried via such cables. The tubular member may be of telescoping construction and thus extensible and rigid.

What is claimed is:

1. In a first artificial space member, the combination comprised of magnetic coupling means movably related with respect to said space member, flexible extensible means connecting said coupling means with said space member, motivation means adapted to propel said coupling means to positions distant with respect to a side of said space member, retraction means capable of regulating the distance between said coupling means and said side of said space member from which said coupling means is adapted to be propelled, the coupling means of said first space member being adapted to magnetically unite with magnetic connector means provided on a second artificial space member whereby said first and second members may be proximately arranged upon retraction of said coupling means subsequent to the uniting of the latter with said magnetic connector means and at least one pair of spacedly disposed magnets provided on each space member, the magnets of each pair being of opposite polarity, a pair of magnets of one space member being arranged to align and unite with a pair of magnets of another space member whereby said space members will be magnetically coupled in a predetermined orientation upon retraction of said coupling means subsequent to the uniting of the latter with said magnetic connector means.

2. A space station for use in outer space comprised of a plurality of individual sections, each respective section including at least one pair of spacedly disposed magnets provided thereon, the magnets of each pair being of opposite polarity, a pair of magnets of one section being arranged to align and unite in outer space with a pair of magnets of another section whereby said sections may be magnetically coupled in a predetermined orientation.

3. A space vehicle having a first pair of magnet members movably attached to the body of said vehicle, said magnets being arranged whereby respective similarly facing poles thereof are of opposite polarity, said magnet members being spacedly arranged with respect to one another and adapted to attract and attach to a second pair of spaced magnet members provided on the body of another space vehicle, said first and second pairs of magnet members, when mutually attached, being adapted to retain said space vehicles in connected, predetermined orientation.

4. In a space vehicle, the combination comprised of magnetic harpoon means and an extensible tubular member for use as a conduit means, said tubular member movably connecting said harpoon means with said space vehicle, motivation means adapted to propel said harpoon means to positions spaced with respect to said space vehicle, and retraction means capable of regulating the distance between said harpoon means and said space vehicle.

5. In a space vehicle as set forth in claim 4 including a compressed gas supply mounted within said space vehicle, said tubular member being connected at one end to said compressed gas supply and connected at the other end to said magnetic harpoon means.

6. In a space vehicle as set forth in claim 5 wherein said motivation means is comprised of nozzle orifices provided upon said harpoon means, said orifices being communicably connected to said tubular member whereby gas from said compressed gas supply can be controllably emitted through said orifices for directional propulsion of said magnetic harpoon means.

7. A device in accordance with claim 5 wherein said magnetic harpoon means comprises an electromagnet.

8. A device for passage from one space vehicle to another comprising securing means, a hollow plenum chamber behind said securing means having exit apertures therein, a hollow flexible tubular conduit passing from said plenum chamber to a space vehicle, a reel for holding said flexible conduit wound thereabout, and a source of fluid pressure connected to the end of said hollow conduit opposite said plenum chamber whereby fluid pressure may be fed from said fluid pressure means through said hollow conduit to said plenum chamber and out through the openings therein to directionally propel said securing means away from said space vehicle.

9. A device in accordance with claim 8 further comprising means to unwind and rewind said reel.

10. A device in accordance with claim 8 wherein said securing means comprises magnetic means.

11. A device in accordance with claim 8 wherein said securing means comprises a grappling hook.

12. A device in accordance with claim 8 wherein said securing means comprises a flexible lasso.

13. A device in accordance with claim 8 wherein said securing means comprises belt means mounted to said plenum chamber by way of a universal joint.

14. A device in accordance with claim 8 wherein said securing means comprises astronaut holding means.

15. A device in accordance with claim 14 wherein said device further comprises means on said plenum chamber capable of steering said astronaut.

16. A device in accordance with claim 8 wherein said securing means comprises article delivery means.

17. In a space vehicle, the combination comprised of securing means and an extensible tubular member for use as a conduit means, said tubular member movably connecting said securing means with said space vehicle, motivation means adapted to propel said securing means to positions spaced with respect to said space vehicle, and retraction means capable of regulating the distance between said securing means and said space vehicle.

18. In a space vehicle as set forth in claim 17 including a compressed gas supply mounted within said space vehicle, said tubular member being connected at one end to said compressed gas supply and at the other end to said securing means, said motivation means comprising nozzle orifices provided upon said securing means, said orifices being communicably connected to said tubular member whereby gas from said compressed gas supply can be controllably emitted through said orifices for directional propulsion of said securing means.

19. In a space vehicle as set forth in claim 18 wherein at least one additional orifice connected to said tubular member is connected to a gas actuated tool for accomplishing work in space.

20. In an artificial space object, the combination comprised of securing means and an extensible tubular member movably connecting said securing means with said space object, motivation means adapted to propel said securing means to positions distant with respect to said space object, and means for retrieving said securing means.

References Cited

UNITED STATES PATENTS

| | | | |
|---|---|---|---|
| 2,359,964 | 10/1944 | Barnett | 114—16.8 X |
| 2,471,635 | 5/1949 | Mark et al. | 277—80 X |
| 3,201,065 | 8/1965 | Dunn | 244—1 |
| 3,285,533 | 11/1966 | Jernigan | 244—1 |

OTHER REFERENCES

Magnetic Forming In Space, Scwinghamer, Astronautics, September 1962, pp. 63-67.

Kamm, Satrac—Space Rendezvous System, Astronautics, June 1961, pp. 32, 33, 44, 46.

FERGUS S. MIDDLETON, Primary Examiner